UNITED STATES PATENT OFFICE.

ALBRECHT THIELE AND GEORG WICHMANN, OF BERLIN, GERMANY, ASSIGNORS TO CHEMISCHE FABRIK AUF ACTIEN (VORM. E. SCHERING), OF BERLIN, GERMANY.

PROCESS FOR THE MANUFACTURE OF 2-PHENYLQUINOLIN-4-CARBOXYLIC ACID.

1,075,171.     Specification of Letters Patent.     Patented Oct. 7, 1913.

No Drawing.     Application filed July 1, 1912. Serial No. 706,987.

*To all whom it may concern:*

Be it known that we, ALBRECHT THIELE and GEORG WICHMANN, doctors of philosophy, chemists, citizens of the Empire of Germany, residing at Berlin, Kingdom of Prussia, German Empire, have invented a new and useful Improvement in Processes for the Manufacture of 2-Phenylquinolin-4-Carboxylic Acid, of which the following is a specification.

According to Döbner & Gieseke (*Annalen der Chemie*, vol. 242 (1887) pages 291 and 292) 2-phenylquinolin-4-carboxylic acid can be obtained by dissolving equal molecules of pyroracemic acid and benzaldehyde and gradually adding to the solution one molecule of anilin dissolved in alcohol. The mixture became strongly heated and was then further heated for three hours upon a water bath. The yield was stated to be about 150 per cent. of the pyroracemic acid. This statement however is not correct for although the applicants have proved by numerous experiments that a yield of 150 per cent. and more of condensation products can be obtained yet of phenylquinolin carboxylic acid at the most 90 per cent. of the pyroracemic acid can be obtained. A process has also been described in the *Berichte der Deutschen Chemischen Gesellschaft* vol. 32 (1899) page 2276 according to which equal molecular quantities of pyroracemic acid and benzylidin anilin are dissolved in alcohol and then heated in a flask provided with a reflux condenser giving, as has been experimentally verified, a very bad yield of 2-phenylquinolin-4-carboxylic acid while large quantities of a by-product insoluble in sodium carbonate solution are produced.

According to this invention 2-phenylquinolin-4-carboxylic acid is made by boiling an alcoholic solution of benzylidin anilin and then gradually adding pyroracemic acid to the boiling solution. The yield in phenylquinolin-carboxylic acid is about 50 per cent. higher than in the named processes while the amount of the worthless by-product insoluble in soda lye is substantially smaller.

*Examples.*

(1) 93 parts by weight of anilin are slowly added while stirring to 106 parts by weight of benzaldehyde while at a temperature of about 40–50 centigrade. After standing for several hours a mass solidifies from which part of the water can be poured off. The remainder of the water can be removed by heating, preferably *in vacuo*. 90 parts by weight of this product of condensation (benzylidin anilin) is dissolved in strong alcohol, the solution is then heated to boiling and 44 parts by weight of pyroracemic acid (or an alcoholic solution of it) are gradually added to the boiling solution. Preferably the mixture of reaction is further heated for some time and the product of condensation is purified in the known manner.

(2) 106 parts by weight of benzaldehyde and 93 parts by weight of anilin are simultaneously dissolved in alcohol, the solution being boiled for about two hours. To the boiling solution 88 parts by weight of pyroracemic acid (or an alcoholic solution of it) are gradually added, the subsequent procedure being as in Example 1.

In the foregoing examples the quantities of the reagents may, of course, be varied.

We claim as our invention:

1. The herein described process of manufacturing 2-phenylquinolin-4-carboxylic acid, which consists in boiling an alcoholic solution of benzylidin anilin, then gradually adding pyroracemic acid to the boiling solution and isolating the product of reaction, substantially as described.

2. The herein described process of manufacturing 2-phenylquinolin-4-carboxylic acid, which consists in boiling an alcoholic solution of benzylidin anilin, then gradually adding pyroracemic acid to the boiling solution, further heating the mixture of reaction, and isolating the product thus formed, substantially as described.

3. The herein described process of manufacturing 2-phenylquinolin-4-carboxylic acid, which consists in dissolving anilin and benzaldehyde together in alcohol, boiling the alcoholic solution, then gradually adding pyroracemic acid to the boiling solution and isolating the product of reaction, substantially as described.

4. The herein described process of manufacturing 2-phenylquinolin-4-carboxylic acid, which consists in boiling an alcoholic solution of benzylidin anilin, then gradually adding an equal molecular quantity of pyroracemic acid to the boiling solution, and isolating the product of reaction, substantially as described.

In testimony whereof we have hereunto set our signatures in the presence of two subscribing witnesses.

ALBRECHT THIELE.
GEORG WICHMANN.

Witnesses:
HENRY HASPER,
WOLDEMAR HAUPT.